United States Patent [19]
Patterson et al.

[11] 3,925,041
[45] Dec. 9, 1975

[54] THERMAL SWING GAS ADSORBER

[75] Inventors: Michael Frederick Patterson; Kenneth Calvin Kather, both of Buffalo, N.Y.

[73] Assignee: Union Carbide Corporation, New York, N.Y.

[22] Filed: Dec. 6, 1974

[21] Appl. No.: 530,346

Related U.S. Application Data

[63] Continuation-in-part of Ser. No. 429,278, Dec. 28, 1973, abandoned.

[52] U.S. Cl. ................................. 55/267; 55/389
[51] Int. Cl.² ........................................ B01D 53/04
[58] Field of Search .......... 55/387, 389, 316, 179, 55/74, 62, 58, 33, 208; 220/9 A, 9 C, 9 D, 9 M, 9 R; 62/48

[56] References Cited
UNITED STATES PATENTS

| | | |
|---|---|---|
| 3,261,087 | 7/1966 | Schumberger |
| 3,489,311 | 1/1970 | Folkerts ............................ 220/9 C |
| 3,670,917 | 10/1972 | Nishimaki et al. ............. 220/9 C X |

*Primary Examiner*—John Adee
*Assistant Examiner*—Ethel R. Cross
*Attorney, Agent, or Firm*—John C. LeFever

[57] ABSTRACT

This invention relates to a gas adsorbent vessel with an internal compressible fibrous layer of thermal insulation positioned against the casing inner surface with rigid preformed sheets of thermal insulation covering the compressible layer in an end to end and side to side abutting relationship with means for outwardly compressing the assembly against the casing inner wall. The vessel is of a type having particular utility for prepurifying air of atmospheric contaminants by thermal swing adsorption prior to cryogenic air separation.

15 Claims, 11 Drawing Figures

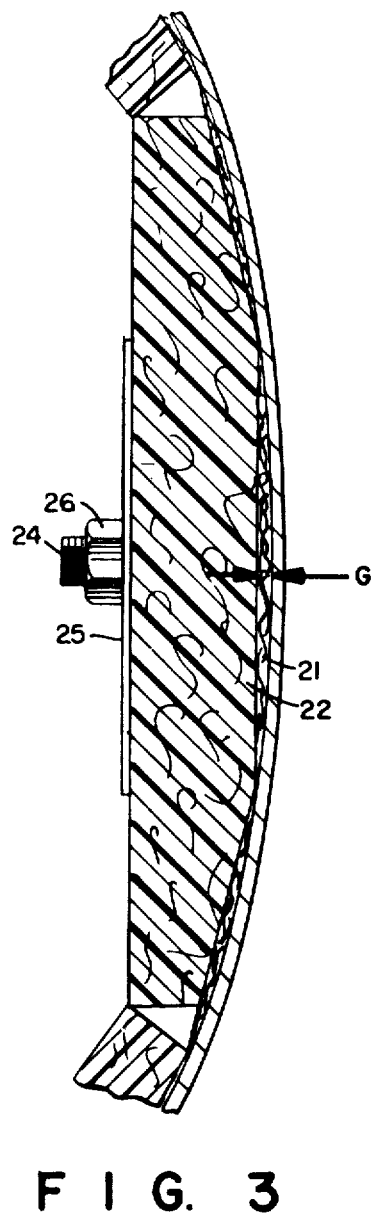
F I G. 3
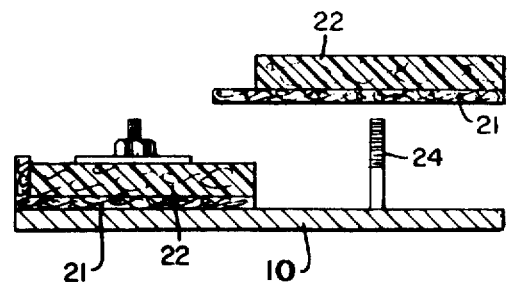
F I G. 4a
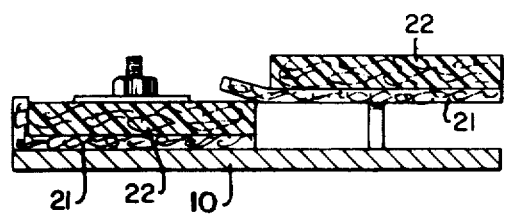
F I G. 4b
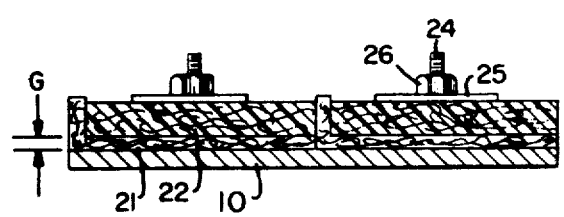
F I G. 4c

THERMAL SWING GAS ADSORBER

CROSS REFERENCE TO RELATED APPLICATION

This application is a continuation-in-part of Ser. No. 429,278 filed Dec. 28, 1973, in the names of Michael F. Patterson and Kenneth C. Kather, now abandoned.

BACKGROUND OF THE INVENTION

This invention relates to a gas adsorbent vessel with internal thermal insulation, of a type having particular utility for prepurifying air of atmospheric contaminants by thermal swing adsorption prior to cryogenic air separation.

In cryogenic and other higher temperature systems, adsorption is generally allowed to take place until a predetermined approximate fraction of the adsorbent capacity has been used. The adsorbed gas is then removed from the adsorbent, by either a rapid decrease in system pressure, an increase in system temperature, or both. Because adsorption is in general a stronger function of temperature than pressure, thermal cycling is used in many situations as a regenerative means of removing adsorbed gas from the adsorbent substrate.

In many thermal swing adsorption systems this regenerative heating is carried out by flowing a stream of heated gas through the adsorbent bed; the bed is subsequently cooled by flowing a stream of cold gas through the bed. In the absence of other effects, the heat transfer involved in heating and cooling the bed poses little problem, given the relatively high rate, turbulent gas flows characteristic of processes employing such beds. If however, there are solid metal walls containing the bed, the associated high heat capacities involved may not permit adequate heatup and cooldown of the walls within a reasonable time. When the bed is in service under such conditions, that portion of the bed in proximity with the vessel walls will tend to remain at a different temperature relative to the rest of the bed, being higher during cooldown and adsorption and lower during regeneration heating for appreciable length of the respective cycle steps. Consequently the vessel wall acts as a heat source during adsorption and as a heat sink during regeneration. The heat sink effect requires a lengthened time for regeneration in order to regenerate the adsorbent near the wall, or if the cycle time is fixed without regard to the wall effect, adequate regeneration may not take place. The heat source effect causes adsorption near the wall to be weak, so that the adsorption front moves through the bed more rapidly in those areas. If this wall effect is not taken into account in fixing the cycle time, extensive breakthrough of impurities could occur early in the adsorption cycle. If taken into account, the cycle time must be shortened, with the bed utilization at a low level.

Because of the adsorptive difficulties associated with the adsorbent bed walls, it is advantageous to isolate the adsorbent bed from the wall, by means of thermal insulation. In cryogenic systems, as for example air separation plant prepurifiers for selectively removing carbon dioxide, water vapor and hydrocarbons at ambient temperature, there are two major thermal problems which insulation may alleviate. The large metallic vessel walls act as a heat sink and as a heat source. Also, there is a continuous heat leak into the vessel during adsorption, since the feed air to the prepurifier is usually somewhat below ambient temperature levels.

The economics associated with uninsulated vessels point up the desirability of vessel insulation. The process operating costs for heating and cooling an uninsulated vessel, along with the adverse effects on the adsorbent capacity due to the heat source and sink characteristics of the vessel wall adjacent the bed, make the non-insulated vessel unattractive economically. The strong influence of temperature on adsorbent capacity, while favoring thermal regeneration over pressure regeneration, means that a severe penalty can be paid if any appreciable portion of the bed fails to swing fully through the desired temperature range during cyclic operation. Roughly, the effects of wall heat capacity may require up to a 30 percent increase in adsorbent bed size. The larger bed, together with higher requirements for heating and cooling the vessel walls, may in turn increase the necessary regeneration flow 50 percent relative to an insulated vessel.

In several commercial cryogenic air separation plants, heat leak into the prepurifier vessel has been virtually eliminated by the use of thermal insulation to the exterior of the vessel. This approach has not, however, solved the internal thermal problem. Performance data show such vessels to operate at comparatively low overall adsorption efficiencies, with localized efficiencies being especially poor in the wall areas of the adsorbent bed. In these vessels, the establishment of uniform temperature across the bed during adsorption is reported to take a substantial length of time, in some cases up to one-quarter of the total cycle.

Internal thermal insulation of such vessels offers a potential solution to the problems of vessel wall thermal effects and vessel heat inleak. The principal problem with internal thermal insulation lies in preventing gas from bypassing the adsorbent bed through the insulation. The bypassing ratio, defined for present purposes as the rate of mass flow of gas through the thermal insulation (and not through the adsorbent bed) divided by the rate of mass flow through the adsorbent bed, provides a useful characteristic for evaluating the effectiveness of internal insulation systems, when related to maximum allowable concentrations of selectively removed feed gas constituents in the adsorbent bed effluent. For a 1200 ton $O_2$/day air separation plant producing gaseous product (feed air flow of 6.85 million ft$^3$/hr.), with a maximum allowable $CO_2$ adsorbent bed effluent concentration of 0.03 ppm, the upper limit for the bypass ratio may for example be about 1/13,000 and preferably about 1/30,000. Qualitatively, this value of the bypass ratio requires an insulation construction with a high resistance (low permeability) to gas flow.

One internal thermal insulation system which has heretofore been widely employed in vertically aligned cylindrical adsorbent beds comprises a vertical cyclindrical stainless steel liner hung from the vessel head, with a fiberglass mat material used to insulate the space between liner and vessel walls. Tight attachment of the end of the stainless steel liner to the vessel head prevents bypassing. Because its thermal conductivity is fairly high, the stainless steel liner must be thin so that the adsorbent bed does not suffer the severe thermal effects associated with the outer vessel wall. This dimensional constraint on the liner creates a constructional problem, since it is difficult to design such liners for thermal cycling and for a collapsing pressure due to bed pressure drop, while still maintaining the desired thinness. In addition, difficulties associated with the installation of a liner make it a mechanically complex and costly solution to the thermal insulation and bypassing problem. Although the liner system presents certain disadvantages in vertical cylindrical vessels, its application to a horizontal cyclindrical vessel is even more difficult. The difficulty here is linked with the formidable task of designing a liner for an extended geometry of somewhat irregular shape which can accommodate the thermal stresses accompanying wide swings of temperature.

The actual design configuration of an adsorbent vessel, horizontal or vertical, is dependent on the bed cross-sectional area requirement. There is however, a dimensional constraint on the vessel size, which is its maximum allowable shipping diameter. This indicates a practical upper limit for transportational purposes, and is generally fixed at 13 ft. Accordingly, the maximum adsorbent bed diameter is placed, for design purposes, at 12 ft. When the preceding design procedure is applied to adsorbent beds for cryogenic air separation plants above the 300–500 ton $O_2$/day range, it may be found that a bed diameter of 12 ft. must be exceeded to obtain the desired design point (% of approach to fluidization). In order to satisfy the cross-sectional requirement under the dimensional constraint, it is then necessary to employ multiple vertical vessels in parallel relationship or alternatively to design for a horizontal bed configuration. Multiple vertical vessels are in general significantly more costly than single horizontal vessels and accordingly, in large volume cryogneic air separation plants, horizontal air prepurifier vessels represent the most suitable geometry.

Regardless of the geometry and orientation of a thermal swing gas adsorber vessel, the internal thermal insulative system should protect the adsorbent bed from thermal effects of the vessel wall and heat leak and also prevent bypassing substantial fractions of feed gas around the adsorbent bed. The thermal insulation must be able to withstand the high temperature characteristic of adsorbent regenration, the resulting expansion and contraction relative to the adsorbent vessel shell, and any pressure variations associated with the cyclic variation of temperature. The thermal insulation must also be conformable to the vessel structure. Since adsorber vessels are characteristically constructed with curved walls, it is necessary to employ thermal insulation of a form which is adaptable to this curvature.

The commonly used thermal insulators may be divided into two general types: form-in-place materials that conform to substrate geometry during installation and rigid pre-formed materials. A form-in-place insulation positioned by cement may appear to be an attractive approach to thermal swing adsorber vessels, considering the curved surfaces. Most fibrous materials in this category, however, are simply too porous and would produce excessively high bypassing ratios for air separation applications. Certain cement materials have adequately low permeability, but their disadvantages include relatively high densities and high values of thermal conductivity. In addition, many of these cements shrink during curing and can present cracking problems. Thermal cracking during temperature cycling is another potential problem.

Many rigid preformed insulative materials have more than adequate flow resistance and would provide low bypassing ratios. The major problem associated with rigid materials is fitting them to the curved surfaces of the adsorber vessel. Machining or pre-molding rigid insulation for an exact fit against the walls of the vessel is impractical from a cost standpoint.

An object of this invention is to provide a gas adsorbent vessel with internal thermal insulation having a low bypassing ratio through the thermal insulation yet which is relatively easy and inexpensive to construct.

Another object of this invention is to provide a horizontally aligned gas adsorbent vessel of the above type having particular utility for prepurification of feed air in large-volume cryogenic air separation applications.

Other objects and advantages of the invention willl be apparent from the ensuing disclosure and appended claims.

SUMMARY

This invention relates to a gas adsorbent vessel employing both compressible and rigid preformed thermal insulation within the outer casing.

In brief, this gas adsorbent vessel includes a rigid outer casing with an adsorbent bed therein and support means for the adsorbent bed bearing against the casing inner surface and the adsorbent bed outer surface. Gas flow passage means extend through the bottom wall and the top wall of the outer casing.

A compressible fibrous layer of thermal insulation material having fiber diameter of less than 20 microns and an uncompressed porosity of greater than 0.95 is positioned against the casing inner surface. A multiplicity of rigid preformed sheets of thermal insulation material being substantially planer and having permeability of less than 150 ft$^2$/hr.-atm (based on air at 70°F) are positioned inwardly of and covering the compressible fibrous layers in an end-to-end and side-to-side abutting relationship with transverse gaps between the casing inner surface and the outer surface of said preformed sheets not exceeding ½ inch. Means are also provided for positioning and outwardly compressing the compressible fibrous layer-rigid preformed sheet assembly against the casing inner surface such that the ratio of the density of the compressible fibrous layer in the compressed state to its density in the uncompressed state is at least 1.5.

As will be described hereinafter in detail, the gas adsorber of this invention has accomplished the aforestated objects by maintaining substantially uniform temperature profiles across the bed during adsorption and regeneration despite cyclic temperature swings (due to the composite internal thermal insulation assembly). The latter has also demonstrated extremely low rates of gas bypass, i.e., 1/40,000. This gas adsorber has also proven to be relatively easy and inexpensive to assemble, and all required elements are commercially available.

BRIEF DESCRIPTION OF THE DRAWINGS

In the drawings

FIG. 3 is an enlarged portionn of FIG. 2 showing assembly of the compressible fibrous layer and rigid preformed sheets of thermal insulation against the side of the casing inner wall.

FIG. 4a, b, and c shows three steps in the preferred method for assembling the thermal insulation system against the casing inner wall.

DESCRIPTION OF PREFERRED EMBODIMENTS

Figure 1:
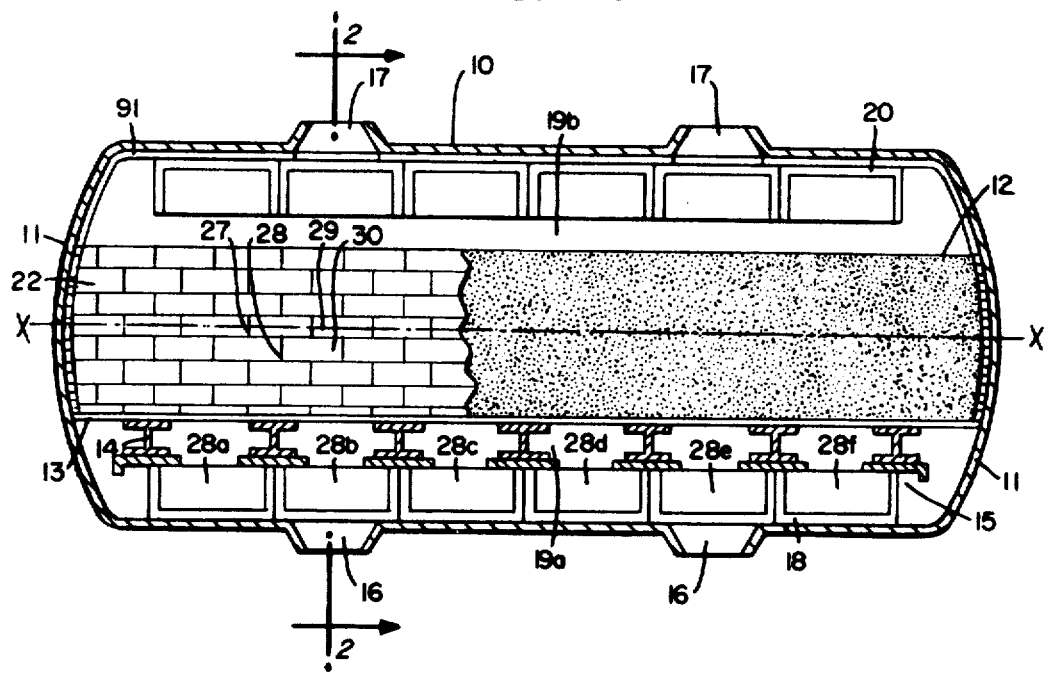
FIG. 1 is an elevation view of a horizontally aligned gas adsorbent vessel according to this invention taken in cross-section with sections cut away to show both the adsorbent bed and the thermal insulation surrounding the adsorbent bed.
Figure 2:
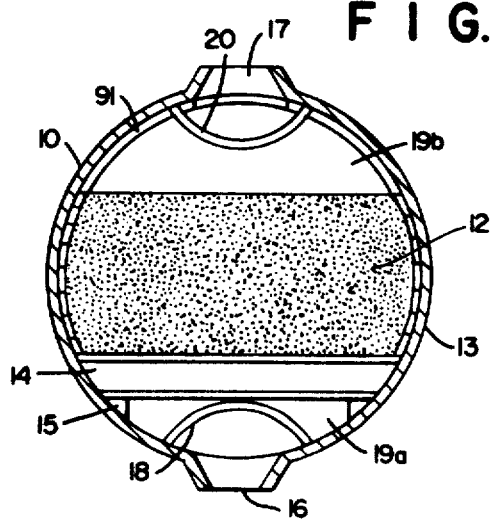
FIG. 2 is an end view of the FIG. 1 gas adsorbent vessel taken in cross-section along line 2—2.

Referring now more specifically to the drawings, FIGS. 1 and 2 are respectively elevation and end views taken in cross-section of one gas adsorber embodiment, of a type suitable for prepurifying air of atmospheric contaminants prior to cryogenic air separation. Rigid cylindrical outer casing 10 is usually constructed of metal such as carbon steel, and positioned with its longitudinal axis x—x aligned in the horizontal direction. Opposite ends of casing 10 are closed by dished heads 11. Adsorbent bed 12 comprising for example pellets of sodium zeolite X (13X) is located within outer casing 10 and extends from end-to-end thereof.

The support system for adsorbent bed 12 includes a multilayer mesh 13 of grid and supporting screens underneath the bed for retaining the adsorbent pellets. Mesh 13 is in turn supported by multiple longitudinally spaced beams 14 extending across (transverse) the casing and beam-supporting braces 15 bearing against the casing inner surface. Gas flow passage means 17 extend through the casing top wall. Gas distributor 18 joins bottom gas passage menas 16 in flow communication through lower space 19a with the bottom adsorbent bed 12, and gas distributor 20 joins top gas passage means 17 with the adsorbent bed top through upper space 19b. As illustrated, the feed gas is introduced through bottom passage means 16, flows through distributor 18 and into the bottom of adsorbent bed 12 for upward passage therethrough and deposition of selectively removable components. The unadsorbed gas is discharged through the adsorbent bed top and upper space 19b to gas distributor (or collector) 20 and emerges through top gas flow passage means 17. The feed gas flow could be reversed and in any event the heated purge gas preferably flows through adsorbent bed 12 for desorption of the selectively removable components in a direction opposite or countercurrent to the previously flowing feed gas.

Two physical forms of thermal insulation are used inside casing 10. The compressible fibrous layer 21 having fiber diameter of less than 20 microns and an uncompressed porosity of at least 0.95 is positioned against the casing inner surface as illustrated in FIG. 3. A multiplicity of rigid preformed sheets 22 are positioned inwardly of and covering the compressible fibrous layer 21. The latter are substantially planer and most conveniently square or rectangular in form, extending from end-to-end of the adsorbent bed 12 in longidudinal rows. In addition, the upper plenum area 19b may be thermally insulated with a fibrous insulation 91 adhesively affixed to the vessel inner wall, as shown in FIG. 1. The purpose of this insulation is to reduce heating losses during thermal regeneration.

Rigid preformed sheets 22 should have a thermal conductivity below 0.075 Btu/hr-ft °F at temperature of 350°F and preferably a gas premeability no more than 1/100 that of the compressed fibrous material. A preferred rigid preformed sheet material consists of a matrix of colloidal calcium silicate and reinforcing glass fibers, commercially available from Johsn-Manville Corporation under the trademark Thermo-12-Block. Other suitable materials include refractory materials based on oxides of silicon and aluminum such as aluminium silicate, magnesium silicate, alumina, and magnesium aluminate. In order to achieve the low gas permeabilities required in this invention, the rigid sheet 22 must be formed from a matrix of colloidal i.e. submicron size particles. Fibrous reinforcements may be desirable to provide sufficiently strong sheets to withstand the necessary installation compression.

Closed cell rigid foam materials such as glass foams are useful as the rigid sheet 22 in some embodiments, but are limited in terms of temperature and pressure. They should only be used in adsorbers wherein the operating pressure is below the compressive strength of the material which is usually below 200 psia. Also the closed cell foams are frequently limited in temperature service to levels below the desired regeneration heating temperature of the adsorber. For these reasons, presently known closed cell foam materials are not suitable for use in air prepurifier adsorbers as described herein.

Although the rigid preformed sheets 22 may be machined or cast with contoured outer surfaces to exactly fit, i.e. be parallel with the casing inner surface, such procedure is not satisfactory from the standpoints of economy and flexibility. By roughly shaping or contouring the outer surface of rigid sheets 22, a reasonable fit to the casing 10 inner surface is obtained with very limited effort. As for example illustrated in FIG. 3, this may be accomplished by beveling the edges so as to minimize the gap between the rigid sheet outer surface and casing inner surface. Stated otherwise, the outer surface of the rigid preformed sheets 22 is at least partially contoured so as to mate with the casing inner surface.

Compressible fibrous thermal insulation may also be provided between at least the abutting ends of adjacent rigid preformed sheets 22, which abutting ends are substantially parallel to the direction of gas flow, to minimize bypassing of feed gas around the adsorbent bed 12. Although not essential, compressible insulation in the end-to-end abutting joints is preferably the outer edges of compressible fibrous layer 21 bent over as hereinafter discussed and illustrated in FIG. 4. a, b and c.

The joints between the abutting ends of rigid sheets 22 filled with fibrous insulation are preferably no wider than the transverse gap between the casing inner surface and the outer surface of sheets 22, i.e. not greater than ½ inch and preferably no greater than 1/16 inch.

Suitable means are needed for positioning and outwardly compressing the compressible fibrous layer 21-rigid preformed sheet 22 assembly against the casing 10 inner surface as for example illustrated in FIGS. 3 and 4. These means preferably comprise studs 24 or similar projections attached as by welding to the casing inner surface, retainer plate 25 and nut or fastener 26. In assembly, the compressible fibrous layer 21 is first placed over and is pierced by the stud 24, followed by the superimposed rigid preformed sheet 22 (also pierced by the stud).

The compressible fibrous layer is preferably sized relative to the rigid preformed sheet 22 such that at least the former's outer ends which are aligned parallel to the direction of gas flow through the adsorbent bed, extend beyond and overlap the ends of rigid sheet 22 a sufficient distance to be retained by and compressed against the abutting ends of adjacent preformed sheets on final assembly of the multiple component thermal insulation system. With this spacial relationship the ends of compressible fibrous layer 21 become the aforementioned fibrous thermal insulation between the aubtting ends of longitudinally adjacent rigid preformed sheets 22. Alternatively, separate strips of compressible fibrous material may be positioned between the abutting ends of rigid preformed sheets 22. It will be understood that to achieve the desired gas flow barrier between abutting ends of longitudinally adjacent rigid sheets, it may not be necessary or desirable to use overlapping ends of compressible fibrous layer beneath both adjacent rigid sheets 22 forming the joint. For example in FIG. 4 only the left hand side of compressible layer 21 is shown as extending outside the superimposed rigid preformed sheet 22. Moreover, in some installations where a high bypass ratio, as for example 1/5000, may be tolerated it may not be necessary to provide compressible fibrous insulation between abutting ends of rigid preformed sheets 22. On the other hand, where low bypass ratios on the order of 1/40,000 are required, such provision of compressible fibrous insulation is desirably employed.

The retainer plate 25 with an opening for stud 24 is next positioned over the inner surface of rigid preformed sheet 22 so as to distribute the compressive load across a substantial portion of such surface and minimize the possibility of breakage. A sufficient compressive load is then applied to retainer plate 25 to increase the density of compressible fibrous layer 21 to at least 1.5 and preferably at least 4 times its density in the uncompressed state. Nut 26 holds the assembly in the desired state of compression.

Compressible layer 21 and rigid preformed sheets 22 are preferably square or rectangular in form and aligned in a multiplicity of longitudinal rows extending from end-to-end of the casing inner surface as illustrated in FIG. 1, with abutting ends 27 and 28 in transversely adjacent rows 29 and 30 respectively, transversely displaced from each other. Abutting ends 27 and 28 are substantially parallel to the direction of gas flow through adsorbent bed 12 (whether bottom-to-top or top-to-bottom). By staggering the transverse joints formed by such abutting ends throughout the insulation system, gas flowing to a particular joint is dead-ended and forced back into the adsorbent bed (for selective adsorption of at least one component) because there is no communicating joint. It will be noted in FIG. 1 that in the longitudinal direction perpendicular to the direction of gas flow (parallel to casing longitudinal axis x—x), the abutting sides of longitudinally adjacent rigid preformed sheets are preferably in alignment for simplicity of construction. This is because gas flow through these longitudinal joints is negligible since there are no pressure gradients in the adsorbent bed 12 in the longitudinal direction.

In the practice of this invention for prepurification of air prior to cryogenic air separation, the bypass ratio is of extreme importance as illustrated by the following example. For a 1200 ton $O_2$/day air separation plant processing 6.85 million ft$^3$/hr. of feed air at 40°F and 315 psia, containing 390 ppm. $CO_2$, water vapor at the saturated value, and small quantities of hydrocarbons, assume the bypass ratio in a prepurifying adsorbent bed is set at the previously mentioned maximum value of 1/13,000. Considering carbon dioxide, the concentration in the adsorber effluent is then 0.03 ppm. Even at this low concentration there would be about 19.4 lbs. $CO_2$ per year entering the cryogenic system and the amount of water in the prepurified feed air would be much higher. These impurities will eventually plug the distillation tray openings to the extent that shutdown, thawing and hot purging are mandatory. The present invention has been demonstrated to provide bypass ratios as low as 1/40,000, thereby reducing the impurity accumulation rate to about one-third of the previously acceptable level.

The compressible fibrous layer of thermal insulation material must comprise fibers having diameters of less than 20 microns and preferably less than 10 microns, an uncompressed porosity of greater than 0.95 and preferably greater than 0.98, and as-installed be compressed such that the ratio of its density in the compressed state to its density in the uncompressed state is at least 1.5 and preferably at least 4.0. Each of these characteristics is important to achieve an insulation system with low gas permeability; high permeabilities of necessity result in high bypass ratios.

Fibrous thermal insulation sheets are generally recognized as having relatively high permeabilities, i.e. they are intrinsically porous in nature. By using relatively small diameter fibers the flow resistance of the insulation is substantially increased, with resultingly smaller permeabilities. Also, the fibers must be capable of being tightly packed by compression. It is of course known that some uncompressed fibrous sheets having relatively high density are more difficult to compress, and that relatively dense materials have relatively low porosity. This relationship may be expressed as:

$$\text{Porosity} = 1 - \left( \frac{\text{apparent density}}{\text{true density}} \right)$$

where the apparent density is the density of the material with voids and the true density is an intrinsic property of the material without voids.

If the porosity of the fibrous sheet is near the lower limit of the acceptable range, i.e. near 0.95, the ratio of the density of the sheet in the compressed state to its density in the uncompressed state will also be relatively low and must be at least 1.5 for the practice of this invention. As will be described hereinafter in detail, one embodiment with fibrous layers composed of 1.0 micron diameter fibers, uncompressed porosity of 0.957 and installed with a 1.5 density compression ratio provides a bypass ratio of 1/15,000 which may be satisfactory for some gas adsorption systems but is higher than desired for air prepurification to cryogenic air separation plants. In general the fibrous layer porosity should be very high in order to accommodate high density compression ratios, hence the preferred uncompressed porosity of greater than 0.98 and density ratio of at least 4.0.

Although the compressible fibrous layers are preferably formed of glass fibers, other materials such as asbestos, alumina-silica and nylon are potentially suitable if available in the form of fibrous layers having acceptable fiber diameter, porosity and compressed to the desired density ratio in the as-installed condition.

It has previously been stated that the rigid preformed sheets should be arranged and constructed such that any transverse gap ("G" FIG. 3) between the casing inner surface and the outer surface of the rigid sheets does not exceed one-half inch. This is necessary to maintain the bypass ratio at an acceptable low level, since the insulative permeability is related to the area for gas flow and thus the width of the available flow channel. Gap G should of course be minimized and the upper limit value of ½ inch requires use of highly efficient compressible fibrous material as layer 21, ie having low permeability not exceeding 15,000 ft²/hr-atm, based on air at 70°F. Gap G preferably does not exceed 1/16 inch.

Figure 5:
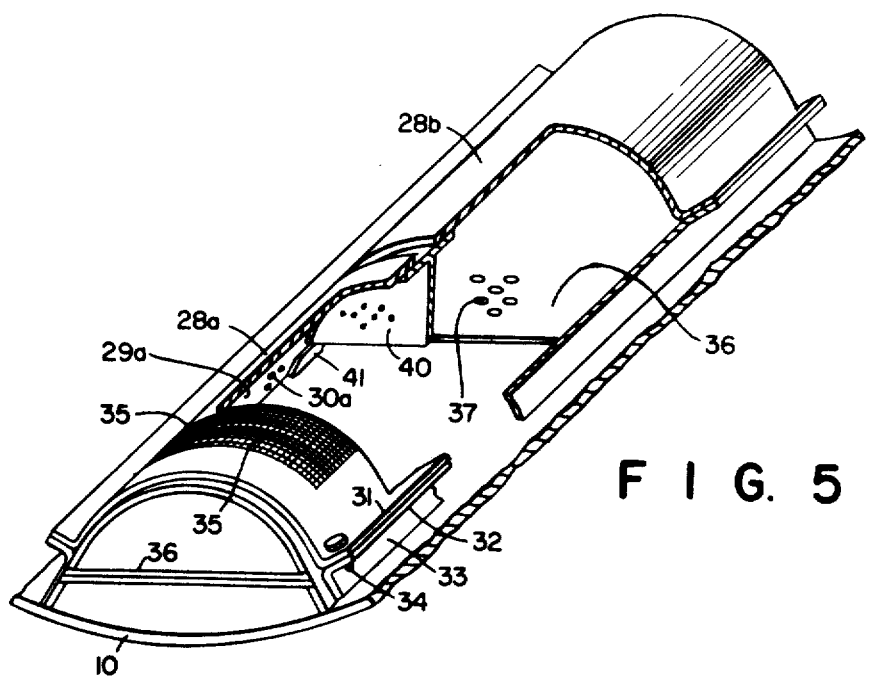
FIG. 5 is an isometric view of a suitable bottom gas distributer for the horizontally aligned gas adsorbent vessel of FIG. 1 with parts cut away.
Figure 6:
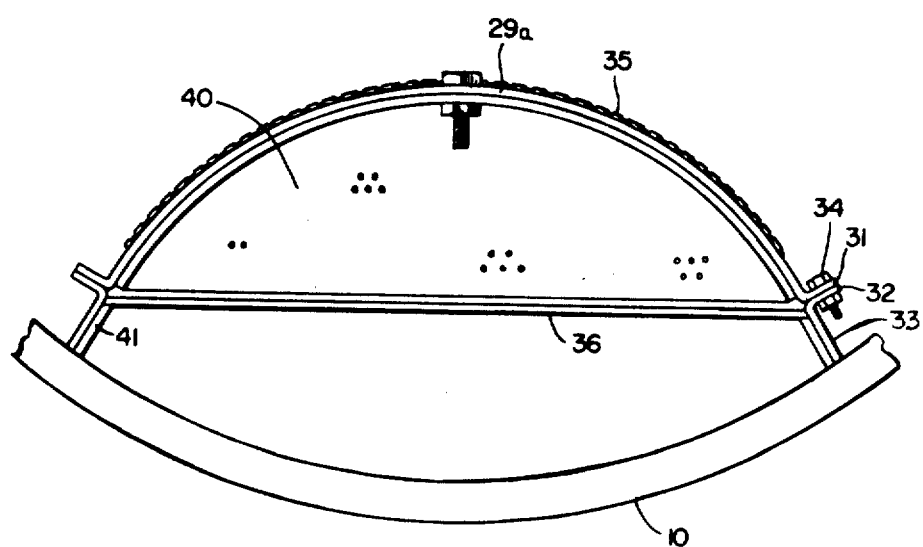
FIG. 6 is an end view of the FIG. 5 gas distributor taken in cross-section along line 6—6.

FIGS. 5 and 6 show a suitable bottom gas distributor 18 in greater detail, and top gas distributor 20 is substantially identical. Each distributor preferably comprises several sub-assemblies as for example 28a through 28f in FIG. 1, longitudinally aligned end-to-end and joined together. Arcuate plate 29a with perforation openings 30a extends from end-to-end of each sub-assembly 28a through 28f with flanged sides 31 mating against the upper flanged sides 32 of base support 33 and positioned by bolt-nut assembly 34. Screen 35 is superimposed on and bonded to arcuate perforated plate 29a. Horizontal plate 36 is only provided in the distributor sub-assemblies 28b and 28e superimposed over bottom gas passage means 16 and has perforated openings 37. The purpose of perforated plate 36 is to deflect gas along the entire length of distributor 18 for uniform flow therethrough, and for this function it is positioned above the casing 10 inner surface by support brace 41. Perforated structural stiffener 40 is bolted to adjacent arcuate plate elements 29a and thereby joins adjacent distributor subassemblies. In operation, feed gas may enter bottom passage means and flow into distributor 18 and then uniformly through perforations 30a in arcuate plate 29a and screen 35. Referring to FIG. 1, the feed gas is now uniformly distributed across and along the length of the adsorbent bed bottom surface and flows upwardly therethrough.

Figure 7:
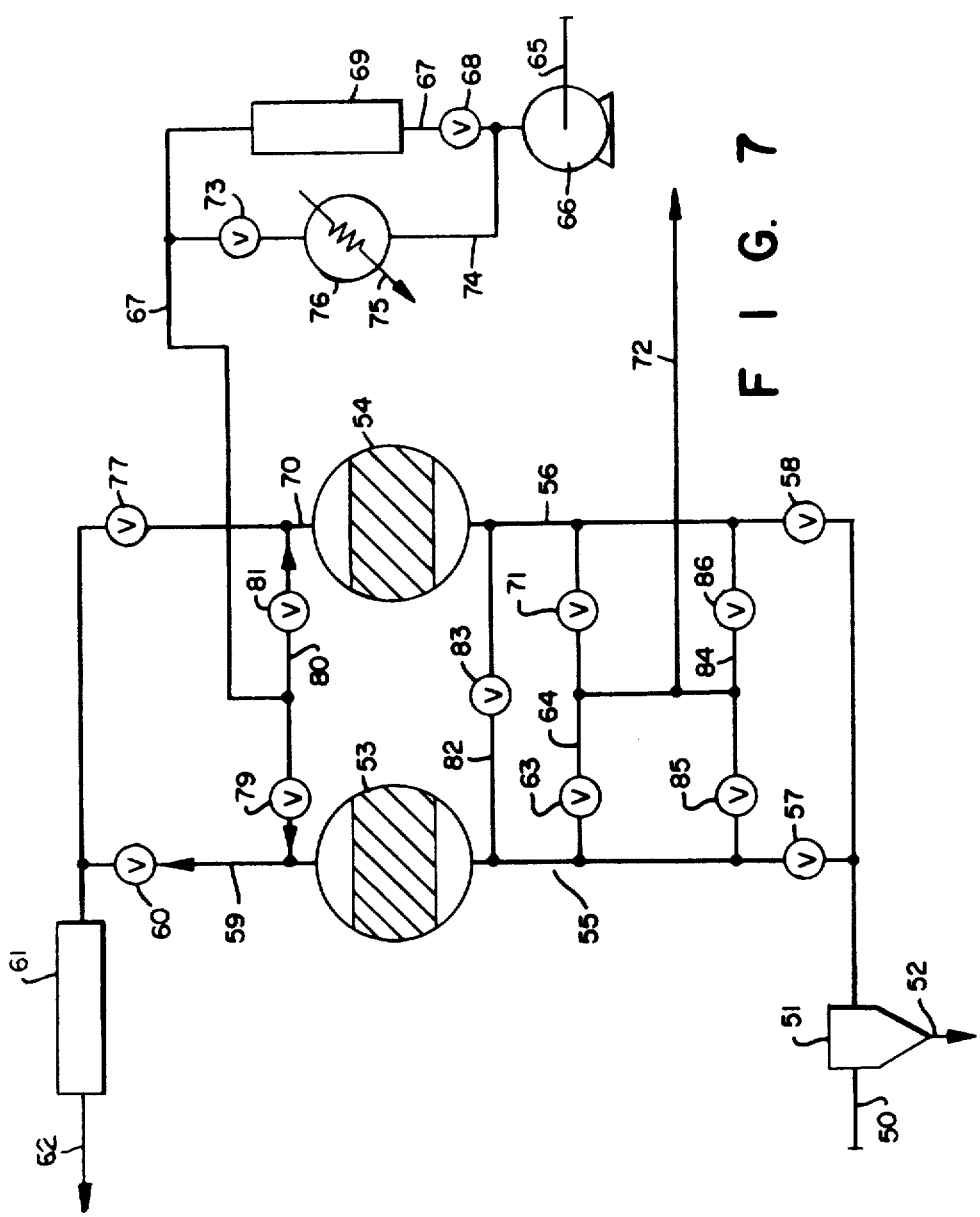
FIG. 7 is a schematic flow diagram of a cryogenic air separation plant prepurifier embodiment of this invention.

FIG. 7 is a schematic flow diagram of a cryogenic air separation plant prepurifier embodiment of the invention. This embodiment will be described as successfully practiced in a large commercial installation. Feed air having been compressed and cooled enters the system through conduit 50 at about 40°F and 250–300 psia, and flows through phase separator 51 for removal of condensed water, the latter being discharged through drain 52. Two horizontally aligned adsorbers 53 and 54 are employed as part of a continuous cyclic air prepurification system for removal of $CO_2$, water vapor and hydrocarbons from feed air in conduit 50 prior to processing in the low temperature section of the cryogenic air separation plant. Adsorbers 53 and 54 are piped in parallel flow relation so that when one adsorber is processing feed air, the other adsorber is being cleaned and prepared for reuse. Feed air conduit 50 joins inlet conduits 55 and 56 containing inlet valves 57 and 58 respectively. The system will be described initially with adsorber 53 "on stream" i.e. processing feed air, so that the latter flows through conduit 55 and control valve 57 therein to first adsorber 53 for selective adsorption of the aforementioned atmospheric contaminants. This feed air may for example contain about 390 ppm $CO_2$ along with trace quantities of hydrocarbons, and of course is saturated with water at the inlet conditions. In the adsorber 53 the contaminants are removed by a selective adsorbent as for example sodium zeolite X to provide a product stream having the following composition: $CO_2 = 0.25$ ppm (maximum), $H_2O = -100°F$ dewpoint at one atmosphere and hydrocarbons below the detectable concentration. The product stream is discharged from first adsorber 53 into discharge conduit 59 with check valve 60 therein and passed to filter 61 for removal of any residual particulate contaminants. The so-filtered product air is then passed through conduit 62 to the low temperature section of the cryogenic air separation plant for further cooling and separation into oxygen and nitrogen.

During the period first adsorber 53 is processing feed air, second adsorber inlet valve 58 is closed as are valve 63 in purge gas discharge conduit 64, valve 83 in repressurization conduit 82, and valve 85 in depressurization conduit 84. During the first adsorber 53 feed air processing period, second adsorber 54 is being regenerated by waste nitrogen preferably from the cryogenic air separation plant. The latter at about 50°F and 14.7 psia is introduced through conduit 65 to blower 66 and is discharged therefrom at about 21.7 psia and approximately 125°F for flow through conduit 67 and valve 68 therein to heater 69. The nitrogen gas is heated therein to a temperature of about 600°F and conducted through conduit 67 to purge gas inlet manifold 80 having check valve 81 therein. The heated purge gas enters second adsorber 54 through conduit 70 at the feed air discharge end thereof. That is, the feed air and purge gas flow consecutively through each adsorber countercurrent to each other. The impurities are desorbed by the heated purge gas in second adsorber 54 and the impurity-containing purge gas is discharged therefrom through conduit 56 at the feed air inlet end, directed through purge gas discharge manifold 64 and valve 71 therein to purge gas discharge conduit 72 for venting to the atmosphere or further processing as desired.

After the second adsorber heating period has been completed and all impurities have been desorbed therefrom, adsorber 54 is cooled. This is accomplished by closing valve 68 in the heater inlet conduit 67 and opening valve 73 in heater bypass conduit 74 so that the purge gas is cooled by indirect heat exchange with cooling water flowing through passageway 75 in exchanger 76. The cool nitrogen gas at about 90°F then passes through joining conduit 67 and manifold 80 to the feed gas discharge end of second adsorber 54. In this manner the second adsorber is cooled to about 100°F and the cooling nitrogen gas emerging from the feed air inlet end conduit 56 is released from the system through conduit 72. On completion of second bed 54 cooling, valve 73 is closed and the nitrogen purge gas is vented directly to the atmosphere.

Second bed 54 has completed its purging and cooling steps and is ready for repressurization with feed air prior to placement "on-stream". This is accomplished by partially opening repressurizing valve 83 in conduit 82. Since second bed discharge valve 77 in conduit 70 is the check type, second bed 54 will repressurize to the aforementioned feed pressure of 250 to 300 psia and the adsorber will warm to about 150°F due to the heat of adsorption.

When the preceding regeneration sequence is completed, the second adsorber 54 is switched to the adsorption step and the previously on-stream first adsorber 53 is switched to the regeneration step. This is accomplished by closing inlet valve 57 so that the entire feed air stream is directed to valve 58 and conduit 56 to second adsorber 54. In switching first adsorber 53 to the regeneration sequence, the vessel must first be depressurized from its high adsorption operating pressure to the low, near-atmospheric regeneration pressure. This is accomplished by opening valve 85 in the depressurization manifold 84 and venting the vessel through purge gas discharge conduit 72. After this depressurization step valve 68 in heater inlet conduit 67 is opened and waste nitrogen is heated and passed through conduit 67, joining purge gas inlet manifold 80 with check valve 79 to the feed gas discharge end of first adsorber 53 for regeneration thereof in an analagous manner to that described in second adsorber 54.

Based on a feed air flow rate of 6.85 million cubic feet per hour and a waste nitrogen flow rate of 812,000 cubic feet per hour, Table 1 lists the cycle sequence and times practiced in the aforedescribed air prepurification embodiment.

TABLE 1

| Cycle Time Hour-Min. | Cycle Sequence | |
|---|---|---|
| | Adsorber I | Adsorber II |
| 0:00 to 0:10 | Adsorption | Depressurization |
| 0:10 to 1:45 | Adsorption | Heating* |
| 1:45 to 3:45 | Adsorption | Cooling |
| 3:45 to 4:00 | Adsorption | Repressurization |
| 4:00 to 4:10 | Depressurization | Adsorption |
| 4:10 to 5:45 | Heating* | Adsorption |
| 5:45 to 7:45 | Cooling | Adsorption |
| 7:45 to 8:00 | Repressurization | Adsorption |

*Heating time includes heater lag of 15 minutes.

The adsorbers used in the aforedescribed embodiment are very similar to the FIGS. 1–3, 5 and 6. Outer cylindrical casing 10 is constructed of 1.5 inch thick carbon steel having a length of about 32 feet and a diameter of about 13 feet. Each adsorber contains 65,000 lbs. of sodium zeolite X pellets (sized to pass through an 8 mesh screen but held on a 12 mesh screen). The adsorbent bed 12 is positioned so that its top surface is about 1.95 ft. above horizontal center axis x—x. Compressible fiber thermal insulation layer 21 is formed of 1 micron average diameter individual glass fibers at uncompressed density of 0.6 lbs. per cubic foot in a nominal thickness of 0.5 inches and surface density of 0.025 lbs/ft$^2$. As installed, fibrous layers 21 are compressed sufficiently for a density ratio of about 8. In the cylindrical portion of the adsorbers between heads 11, rigid preformed sheets 22 are 12 inches long × 6 inches wide by 1½ inches thick and aligned in longitudinal rows with abutting ends in transversely adjacent rows being transversely displaced from each other at about 6 inch intervals. In the head areas where uniform curvature occurs, rigid preformed sheets are 6 inches long × 6 inches wide by 1½ inches thick. On the areas between the cylindrical shell and the uniformly curved head, the radius of curvature is very small and rapidly changing so that it is necessary to manually "fit-up" the sheets by bevelling and fitting to size. The aforementioned 1 micron diameter glass fiber layer is also used as thermal insulation between the abutting ends of rigid sheets 22, the transverse gaps are about 1/16 inch. Flow-deflecting baffle means, as hereinafter described in connection with FIG. 9, were employed in the longitudinal joints between adjacent longitudinal rows of the rigid sheets.

Initial operation of the above-described prepurifiers is considered excellent. The prepurified air was monitored continuously for $CO_2$ content after startup by an infrared analyzer, and all $CO_2$ concentrations were below the analytical limit of the instrument. This indicates that the prepurifier's thermal insulation system maintains substantially uniform temperature profiles and low rates of gas bypass.

Figure 8:
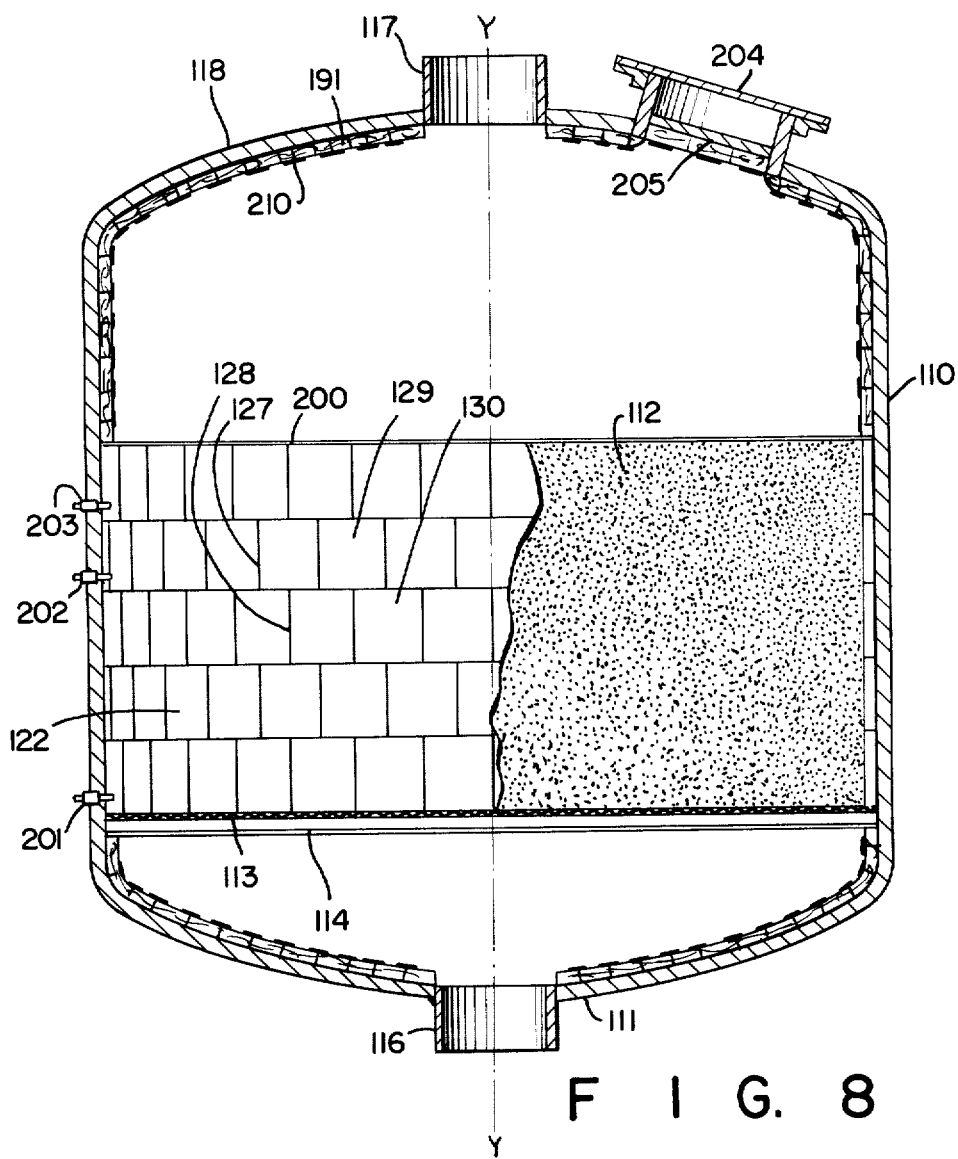
FIG. 8 is an elevational view of a vertically aligned gas adsorbent vessel according to the invention taken in cross-section with sections cut away to show both the adsorbent bed and the thermal insulation surrounding the adsorbent bed.

FIG. 8 shows an elevational view in cross-section of another gas adsorber embodiment according to the invention, having a rigid cylindrical outer casing 110 with its longitudinal axis Y—Y aligned substantially in the vertical direction. Such type of adsorber vessel is suitable for the prepurification of air in low volume cryogenic air separation plants, e.g. below the 300–500 ton/day range; another particularly preferred application is for adsorptive removal of sulfur dioxide in the process disclosed and claimed in U.S. Pat. No. 3,829,560, wherein sulfur dioxide in the effluent from the acid adsorber of a contact process sulfuric acid plant is adsorbed in a fixed bed of molecular sieve adsorbent, purged from the adsorption bed with hot dry oxygen-containing gas and recycled to the plant for further processing.

The illustrated vertical adsorber features lower gas flow passage means 116 extending through the bottom end wall 111 and upper gas flow passage means 117 extending through the top end wall 118. Adsorbent bed 112 is located within the outer casing 110 and is supported by a multilayer mesh 113 of grid and supporting screens underneath the bed which is in turn supported by multiple transversely spaced beams 114 extending across the casing perpendicular to axis Y-Y and bearing against the casing inner surface. A multilayer mesh 200 of grid and screens may also be provided on top of the adsorbent bed and suitably secured to the casing wall if desired. Gas distributor means such as employed in the FIG. 1 horizontal vessel are not required in this embodiment due to its regular geometry, i.e. cylindrical casing and adsorbent bed circular cross section. The feed gas flow may be from bottom to top or top to bottom but as disclosed in connection with the previous embodiment, the regeneration purge gas preferably flows through adsorbent bed 112 for desorption of the selectively removed components in a direction opposite or counter current to the previously flowing feed gas.

The insulation system employed in the vertical vessel around the adsorbent bed may suitably be of the same specific type as described hereinabove in connection with the embodiment of FIGS. 1–4, generally comprising a multiplicity of rigid preformed sheets 122 of thermal insulation material with a permeability of less than 150 ft$^2$/hr-atm (based on air at 70°F) positioned inwardly of and covering a compressible fibrous layer of thermal insulation with a fiber diameter of less than 20 microns and an uncompressed porosity of greater than 0.95.

In accordance with the present invention, the rigid plannar sheets are positioned in side-to-side and end-to-end abutting relation with transverse gaps between the casing inner surface and the outer surface of the rigid sheets not exceeding ½ inch. As shown the rigid sheets are aligned in a multiplicity of rows extending perpendicular to the direction of gas flow through the bed, with the abutting ends aligned substantially parallel to the direction of gas flow. The sheets are specifically aligned so that the ends 127 and 128 of sheets in transversely adjacent rows 129 and 130 are transversely displaced from each other in order to 'dead-end' any gas flow through the associated joints. The vessel also features fibrous insulation 191 in the upper and lower plenum areas affixed to the vessel inner wall with studfastener means 210. This insulation serves to reduce heating losses during thermal regeneration of the adsorbent bed. In order to monitor the performance of the adsorber, gas sample taps 201, 202, and 203 are provided extending through the casing wall and internal insulation into the adsorbent bed. A removable cover assembly 204 suitably insulated on its inner facing surface 205 with fibrous and rigid preformed sheet insulation is provided for routine access and periodic maintenance of the vessel.

Figure 9:
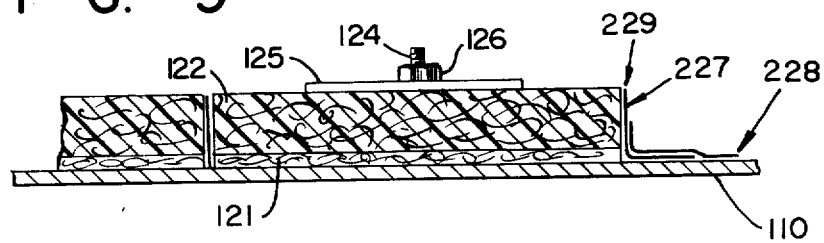
FIG. 9 is an enlarged portion of FIG. 8 showing the details of the internal insulation system according to a further modification of the invention, wherein gas flow-diverting means are employed to return the bypass flow to the absorbent bed.

FIG. 9 is an enlarged portion of FIG. 8 showing the details of the internal insulation system therein. In this modified embodiment, gas flow-diverting barrier means are disposed between the abutting sides of the preformed sheets in the transversely adjacent rows to direct by-passing gas into the adsorbent bed. As shown, rigid preformed sheets 122 are positioned overlying the compressible fibrous insulation 121, and the resulting assembly is compressed and secured to the casing inner wall by means comprising studs 124, retainer plate 125 and nut or fastener 126, in a manner as described in connection with FIG. 4 herein. The gas flow-diverging barrier means in this system comprise metal foil sheets 227 gas-tightly secured to the casing inner surface at one end by means of adhesive tape 228. The metal foil sheets are disposed between the abutting sides of the preformed sheets and extend inwardly from the casing inner surface toward the adsorbent bed such that the free end 229 is opposite the taped end and substantially adjacent to the adsorbent bed.

Functionally, the above-described barrier means insure that any gas which flows into and through the fibrous insulation layer between the rigid preformed sheets and the casing inner surface will be directed back into the adsorbent bed for removal of the selectively adsorbable components therein. The barrier means are suitably positioned during installation of the insulation system as successive adjacent rows are built up, and may be employed as desired in the joints transverse to the gas flow direction, to lower the concentration of a selectively adsorbable components in the purified gas effluent from the adsorber. Gas flow-diverting means are not an essential feature of the present invention, but permit higher effluent gas purities to be achieved for a given by-pass ratio in connection with the adsorber vessels herein disclosed. Thin metal foil sheets are preferred in practice, as for example 2-3 mil thick stainless steel sheets, but the gas flow barrier means may generally comprise any suitable material having a requisite low thermal conductivity and permeability. Similarly, the barrier means may be secured to the casing inner surface by any suitable means including tape, adhesive and sealant materials having the necessary thermal stability and resistance to gas flow.

The importance of several aspects of this invention was illustrated in a series of tests hereinafter described.

In the first test, the compressible fibrous layer of thermal insulation was 3/16-inch thick (uncompressed) glass felt having average fiber diameter of 1.0 micron and porosity of 0.957, (density of 6 lbs/ft$^3$) compressed to ⅛-inch for a compression density ratio of 1.5. The rigid preformed sheet of thermal insulation was calcium silicate reinforced with asbestos fibers, having a density of 11 lbs/ft$^3$ and thermal conductivity of 0.04 Btu/hr. ft. °F at temperature of 35°F, and a permeability of 1 ft$^2$/hr-atm, based on air at 70°F. The individual sheets were 6 inches wide × 3 feet long × ½ inch thick, with slightly beveled edges. The assembly was substantially as illustrated in FIG. 3, with a transverse gap G of about ⅛ inch, resulting from a torque of 16–18 in-lb. on the lock nut 26 of the compression assembly. A 4 ft. by 4 ft. curved carbon steel wall ¼ inch thick was used having a 6 ft. radius of curvature. The bypass ratio was 1/15,000, a slight improvement over the value considered acceptable by the prior art for the aforementioned prepurification of air in cryogenic air separation applications.

In the second test, the compressible fibrous sheet of thermal insulation was identical to that used in the first test except the porosity was 0.996 (density of 0.6 lbs/ft$^3$) and the uncompressed mat was ½ inch thick. The rigid preformed sheets and test assembly were identical to the first test, but the assembly was compressed with a torque of 18 in-lbs. to a compressible layer width of 1/16 inch — a density ratio of 8.0 as compared with a density ratio of 1.5 for the first test. The average bypass ratio in the second test was exceedingly low — only 1/40,000.

Comparison of the above test reveals that the significant differences in the materials were the higher density and lower initial thickness of the compressible fibrous layer used in the first test. Although the first test material's lower initial thickness would appear to offer a performance advantage insofar as minimizing bypass flow area, its high density did not permit much compression. For this reason, the material did not effectively mold to the gap geometry, and the final gap remained wide. In the second test, the material was thicker, but its low density permitted a greater level of compression and good mold-in-place behavior. As a result, the final bypass flow (gap) area was only one-half of that in the first test and a low by-pass ratio (1/40,000) was achieved.

The third and fourth tests were designed to determine the effectiveness of the present invention in eliminating adverse wall thermal effects in the performance of an adsorbent bed. The stainless steel casing had an inner diameter of 14 13/16 inch with ⅛-inch thick walls, was equipped with sample taps at 6-inch intervals and containing a 3 foot high fed of sodium zeolite X pellets (passing through 8 mesh and retained 12 mesh screen). Air was flowed through the bed at a rate of 5400 cu.ft/hr., containing 1150 ppm $CO_2$ and 1600 ppm $H_2O$. The absorption conditions were fixed at 65 psia and 37°F, and $CO_2$ concentrations were measured as a function of time at the various taps to evaluate bed performance.

Due to the casing geometry it was not feasible to internally insulate in accordance with this invention, but a comparison was made based on an uninsulated hollow dummy box. The latter was constructed of ¼ inch thick carbon steel plate with dimensions of 3 ft. length × 1ft. width × 3½ inch depth, and inserted into the adsorbent bed. During the adsorption run the bed experienced a thermal heat source effect from both the casing wall and the dummy box.

In the fourth case, the hollow dummy box was replaced with an assembly comprising a steel plate of 3 ft. length × 1 ft. width × ½ inch thickness, insulated with a compressible fibrous layer-rigid preformed sheet assembly of materials identical to those used in the second test. The asbestos-reinforced calcium silicate sheets were 1½ inch thick and the assembly was compressed sufficiently for the density ratio of the glass fiber layer to be 8.0, i.e. the thickness was reduced from ½ inch to 1/16 inch. The assembly was constructed in the previous manner as illustrated in FIGS. 3 and 4, except that the rigid preformed sheets were not contoured since a flat metal plate was used. The thermally insulated plate assembly thus contained the same weight of metal and occupied the same volume in the adsorbent bed as the metal dummy box of the third test.

During the fourth test air was passed through the adsorbent bed at the same process conditions as the third test, and comparisons were made based on measurement of carbon dioxide breakthrough times. A quantitative measure of the efficiency of the adsorbent bed was obtained by dividing the $CO_2$ breakthrough time at the product sample tap by the $CO_2$ breakthrough time at the gas sample tap at the very top of the bed away from solid surfaces. This value will always be less than 100% due to early $CO_2$ breakthrough in the area near solid metal surfaces. In this context the efficiencies for the uninsulated dummy box of the third test averaged 67.2% for effluent concentrations in the range of 2–7 ppm. $CO_2$, while efficiencies for the insulated plate averaged 75% in the same range. Although these experimental efficiencies are not exceedingly high due to the thermal wall effects, the difference in efficiencies illustrates the advantage of this invention in eliminating thermal effects associated with metallic surfaces.

Summarizing a particularly preferred embodiment of the invention, an air prepurifier adsorbent vessel is provided having a rigid cylindrical outer casing with its longitudinal axis aligned substantially in the horizontal direction and a sodium zeolite X adsorbent bed within the casing in the central part thereof and extending from end-to-end. Support means are provided for the adsorbent bed bearing against the casing inner surface and the adsorbent bed outer surface. Air flow passage means extend through the bottom wall and the top wall of the casing, and air distributor means provide communication between the air flow passage means and the end-to-end length of the adsorbent bed bottom and top for air flow through the adsorbent bed substantially normal to the casing's longitudinal axis. A compressible glass fibrous layer of thermal insulation material having fiber diameter of about 1.0 micron and an uncompressed porosity of about 0.996 is positioned against the casing inner surface, and a multiplicity of rigid preformed substantially planar sheets of calcium silicate reinforced with glass fiber thermal insulation having a permeability of about 1 ft²/hr-atm based on air at 70°F. are positioned inwardly of and covering said compressible glass fibrous layer in an end-to-end and side-to-side abutting relationship with outer surfaces at least partially contoured so as to mate with the inner surface of said cylindrical outer casing and transverse gaps between the casing inner surface and the outer surface of the rigid preformed sheets not exceeding about 1/16 inch. The preformed sheets are aligned in a multiplicity of longitudinal rows with abutting ends in transversely adjacent rows being transversely displaced from each other. Compressible glass fibrous insulation is also positioned between at least the abutting ends of adjacent preformed sheets which abutting ends are substantially parallel to the direction of air flow through the adsorbent bed.

Means are also provided for positioning and outwardly compressing the compressible glass fibrous layer-rigid preformed calcium silicate and glass fiber sheet assembly against the casing inner surface such that the ratio of the density of the compressible fibrous layer in the compressed state to its density in the uncompressed state is at least 4.

Although the invention has been specifically described in connection with the applications of air prepurification for cryogenic air separation and of recovery of sulfur dioxide from sulfuric acid plant tail gas streams, the instant gas adsorbent vessel is also useful for other thermal swing systems in which thermal wall effects associated with the vessel casing must be eliminated so as to prevent excessive break-through of impurities during the adsorption step. These systems include removal of nitrogen oxides from nitric acid plant off-gas streams, drying of annealing gas, $CO_2$ and water removal from natural gas prior to separation, and purification of other light hydrocarbon gas streams such as ethane, propane, and ethylene.

It will also be appreciated that although preferred embodiments have been described in detail, other embodiments are contemplated and that modifications of the disclosed features are within the scope of the invention.

What is claimed is:

1. A gas adsorbent vessel comprising: a rigid outer casing, an adsorbent bed within said casing; support means for said adsorbent bed bearing against the casing inner surface and the adsorbent bed outer surface; gas flow passage means extending through the bottom wall and the top wall of said casing; a compressible fibrous layer of thermal insulation material having fiber diameter of less than 20 microns and an uncompressed porosity of greater than 0.95 positioned against the casing inner surface; a multiplicity of rigid preformed sheets of thermal insulation material having permeability of less than 150 ft²/hr-atm based on air at 70°F, being substantially planar and positioned inwardly of and covering said compressible fibrous layer in an end-to-end and side-to-side abutting relationship with transverse gaps between the casing inner surface and outer surface of said preformed sheets not exceeding ½ inch; and means for positioning and outwardly compressing the compressible fibrous layer-rigid preformed sheet assembly against said casing inner surface such that the ratio of the density of the compressible fibrous layer in the compressed state to its density in the uncompressed state is at least 1.5.

2. A gas adsorbent vessel according to claim 1 wherein the preformed sheets are aligned in a multiplicity of rows extending perpendicular to the direction of gas flow through the adsorbent bed, said abutting ends are substantially parallel to said direction of gas flow, and said abutting ends in transversely adjacent rows are transversely displaced from each other.

3. A gas adsorbent vessel according to claim 1 wherein the fiber diameter of said compressible fibrous layer is less than 10 microns.

4. A gas adsorbent vessel according to claim 1 wherein the uncompressed porosity of said compressible fibrous layer is greater than 0.98.

5. A gas adsorbent vessel according to claim 1 wherein the ratio of the density of the compressible fibrous layer in the compressed state to its density in the uncompressed state is at least 4.0.

6. A gas adsorbent vessel according to claim 1 wherein the outer surface of said preformed sheet is at least partially contoured so as to mate with the inner surface of said rigid outer casing.

7. A gas adsorbent vessel according to claim 1 wherein said compressible fibrous layer is formed of glass fibers having fiber diameter of about 1.0 microns and an uncompressed porosity of about 0.996.

8. A gas adsorbent vessel according to claim 1 wherein said rigid preformed sheets are formed of calcium silicate reinforced with glass fiber having permeability of about 1 ft$^2$/hr-atm, based on air at 70°F.

9. A gas adsorbent vessel according to claim 1 wherein the gas permeability of the preformed sheets is no more than 1/100 that of the compressible fibrous layer.

10. A gas adsorbent vessel according to claim 1 wherein the preformed sheets are aligned in a multiplicity of rows extending perpendicular to the direction of gas flow through the adsorbent bed, and gas flow-diverting barrier means are disposed between said abutting aides of the preformed sheets in said transversely adjacent rows to direct bypassing gas into said adsorbent bed.

11. A gas adsorbent vessel according to claim 10 wherein said gas flow-diverting barrier means comprise metal foil sheets gas-tightly secured to said casing inner surface at one end and extending inwardly between said abutting sides of the preformed sheets with the opposite end substantially adjacent to said adsorbent bed.

12. A gas adsorbent vessel according to claim 2 including compressible fibrous thermal insulation between at least said abutting ends of adjacent preformed sheets.

13. A gas adsorbent vessel comprising: a rigid cylindrical outer casing with its longitudinal axis aligned substantially in the horizontal direction, an adsorbent bed within said casing in the central part thereof and extending from end-to-end; support means for said adsorbent bed bearing against the casing inner surface and the adsorbent bed outer surface; gas flow passage means extending through the bottom wall and the top wall of said casing; gas distributor means between said gas flow passage means and the end-to-end length of the adsorbent bed bottom and top for gas flow through said adsorbent bed substantially normal to said longitudinal axis; a compressible fibrous layer of thermal insulation material having fiber diameter of less than 20 microns and an uncompressed porosity of greater than 0.95 positioned against the casing inner surface; a multiplicity of rigid preformed sheets of thermal insulation material having permeability of less than 150 ft$^2$/hr-atm based on air at 70°F, being substantially planar and positioned inwardly of and covering said compressible fibrous layer in an end-to-end and side-to-side abutting relationship with transverse gaps between the casing inner surface and outer surface of said preformed sheets not exceeding ½ inch; and means for positioning and outwardly compressing the compressible fibrous layer-rigid preformed sheet assembly against said casing inner surface such that the ratio of the density of the compressible fibrous layer in the compressed state to its density in the uncompressed state is at least 1.5.

14. A gas adsorbent vessel comprising: a rigid cylindrical outer casing with its longitudinal axis aligned substantially in the vertical direction, an adsorbent bed within said casing; support means for said adsorbent bed bearing against the casing inner surface and the adsorbent bed outer surface; gas flow passage means extending through the bottom end wall and the top end wall of said casing; a compressible fibrous layer of thermal insulation material having fiber diameter of less than 20 microns and an uncompressed porosity of greater than 0.95 positioned against the casing inner surface; a multiplicity of rigid preformed sheets of thermal insulation material having permeability of less than 150 ft$^2$/hr-atm based on air at 70°F, being substantially planar and positioned inwardly of and covering said compressible fibrous layer in an end-to-end and side-to-side abutting relationship with transverse gaps between the basing inner surface and outer surface of said preformed sheets not exceeding ½ inch; and means for positioning and outwardly compressing the compressible fibrous layer-rigid preformed sheet assembly against said casing inner surface such that the ratio of the density of the compressible fibrous layer in the compressed state to its density in the uncompressed state is at least 1.5.

15. An air prepurifier adsorbent vessel comprising: a rigid cylindrical outer casing with its longitudinal axis aligned substantially in the horizontal direction, a sodium zeolite X adsorbent bed within said casing inner the central parts thereof and extending from end-to-end; support means for said adsorbent bed bearing against the casing inner surface and the adsorbent bed outer surface; air flow passage means extending through the bottom wall and the top wall of said casing; air distributor means between said air flow passage means and the end-to-end length of the absorbent bed bottom and top; a compressible glass fibrous layer of thermal insulation material having fiber diameter of about 1.0 microns and an uncompressed porosity of about 0.996 positioned against the casing inner surface; a multiplicity of rigid preformed sheets of calcium silicate reinforced with glass fiber thermal insulation material having permeability of about 1 ft$^2$/hr-atm, based on air at 70°F, being substantially planar and positioned inwardly of and covering said compressible glass fibrous layer in an end-to-end and side-to-side abutting relationship with outer surfaces at least partially contoured so as to mate with the inner surface of said cylindrical outer casing and transverse gaps between the casing inner surface and the outer surface of said rigid preformed sheets not exceeding about 1/16 inch, said preformed sheets being aligned in a multiplicity of longitudinal rows with abutting ends in transversely adjacent rows being transversely displaced from each other; compressible glass fibrous thermal insulation between at least the abutting ends of adjacent preformed sheets which abutting ends are substantially parallel to the direction of glass flow through said adsorbent bed; and means for positioning and outwardly compressing the compressible glass fibrous layer-rigid preformed calcium silicate and glass fiber sheet assembly against said casing inner surface such that the ratio of the density of the compressible glass fibrous layer in the compressed state to its density in the uncompressed state it at least 4.

* * * * *

UNITED STATES PATENT OFFICE
CERTIFICATE OF CORRECTION

Patent No. 3,925,041    Issue Date December 9, 1975

Inventor(s) Michael Fredrick Patterson, et al

It is certified that error appears in the above-identified patent and that said Letters Patent are hereby corrected as shown below:

Column 17, line 27, the word "aides" should be -- sides --.

Column 18, line 20, the word "basing" should be -- casing --.

Column 18, line 31, the word "inner" should be -- in --.

Column 18, line 32, the word "parts" should be -- part --.

Signed and Sealed this thirtieth Day of March 1976

[SEAL]

Attest:

RUTH C. MASON
*Attesting Officer*

C. MARSHALL DANN
*Commissioner of Patents and Trademarks*